United States Patent [19]
Baker

[11] 3,958,505
[45] May 25, 1976

[54] EGG CRACKING MACHINE

[76] Inventor: Lamar Baker, 323 Harkness Ave., San Francisco, Calif. 94134

[22] Filed: Nov. 21, 1974

[21] Appl. No.: 525,763

[52] U.S. Cl. ................................. 99/495; 99/498; 99/568
[51] Int. Cl.² .......................................... A23J 1/00
[58] Field of Search ............. 99/495, 498, 507, 568

[56] References Cited
UNITED STATES PATENTS

| | | | |
|---|---|---|---|
| 1,837,357 | 12/1931 | Chapman | 99/498 |
| 2,305,061 | 12/1942 | Christianson | 99/495 X |
| 2,465,176 | 3/1949 | Serbu | 99/498 X |
| 2,524,844 | 10/1950 | Smith | 99/498 X |

*Primary Examiner*—Robert W. Jenkins
*Assistant Examiner*—James A. Niegowski

[57] ABSTRACT

An egg cracking machine is provided wherein a first conveyor moves a plurality of eggs past a stationary blade which severs the top portion of the egg. The top portions of the eggs are carried away by a second conveyor. The egg bottoms are emptied as the egg bottoms are inverted. The egg shells are prevented from intermixing with the emptied contents by guide rails. The egg contents are collected for use in collector means beneath the first conveyor.

2 Claims, 6 Drawing Figures

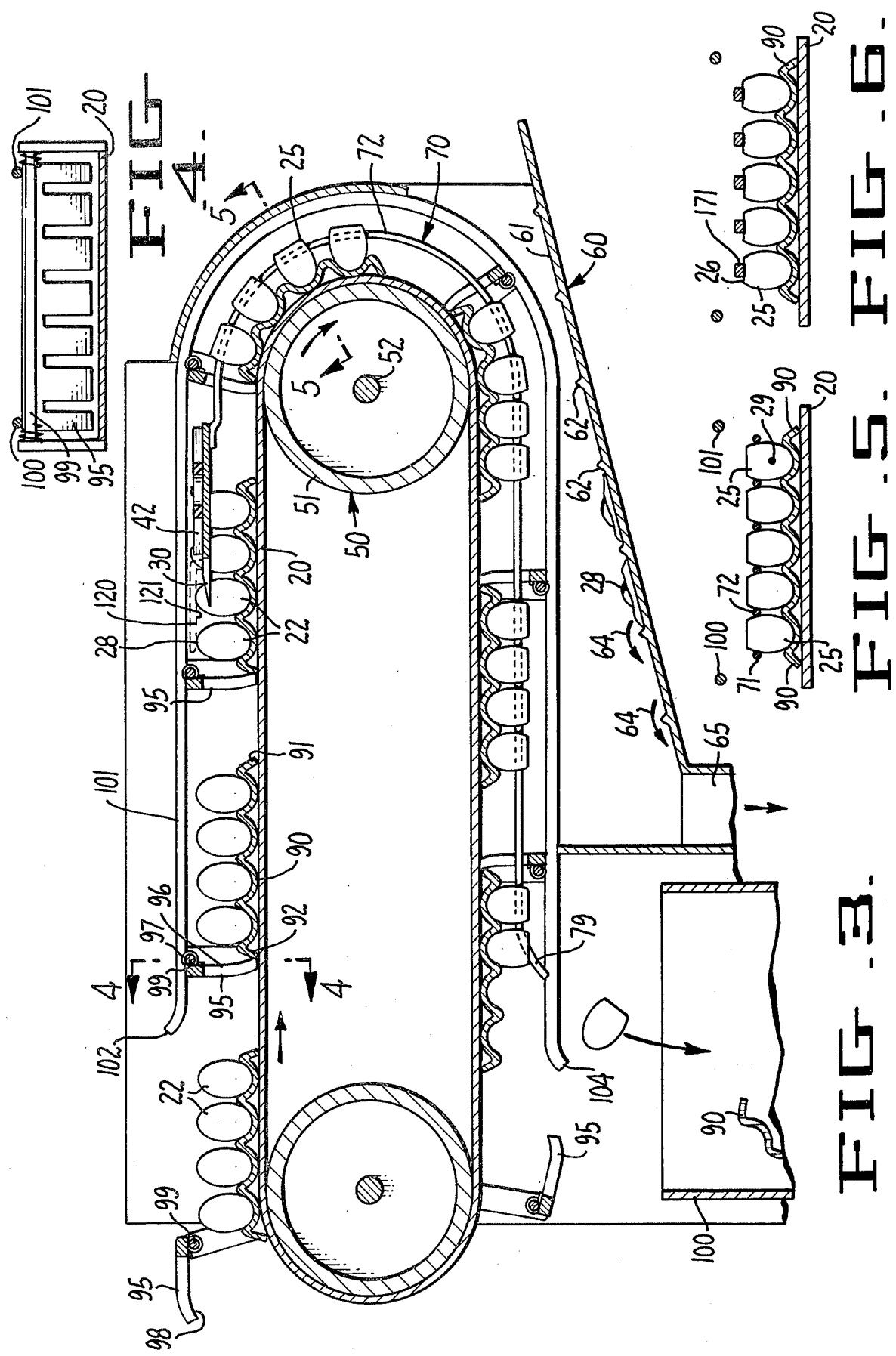

EGG CRACKING MACHINE

This invention relates to an egg cracking machine for automatically emptying the contents of eggs for use in various types of cooking.

Egg cracking machines are known which use relatively complex equipment for removing the contents of eggs automatically. Such machines are shown in the Noltes U.S. Pat. No. 3,147,783 dated Sept. 8, 1964 for "Egg Opener and Separator"; the Drexel U.S. Pat. No. 1,997,881 dated Apr. 16, 1935 for "Egg Cracking Machine"; the Kauffman et al U.S. Pat. No. 2,898,961 dated Aug. 11, 1959 for "Egg Breaker and Shell Expressor"; the Schaber U.S. Pat. No. 2,489,182 dated Feb. 21, 1950 for "Machine for Opening Eggs and Separating the Shells of the Eggs and their Contents". It is also known in the prior art to provide a machine for separating the egg whites from the yolks as shown in the Chapman U.S. Pat. No. 1,837,357 dated Dec. 22, 1931 for "Egg Handling Apparatus".

A primary object of this invention is to provide an automatic egg cracking machine which is both efficient and extremely simple to operate.

A further object of this invention is to provide an egg cracking machine for removing the contents of eggs automatically which is easily cleaned.

Further objects and advantages of this invention will become apparent from the following description of a preferred embodiment and the drawings, wherein:

FIg. 3 is a side elevational view, in section, of the machine of FIG. 1;

FIG. 4 is a sectional view along the line 4—4 of FIG. 3;

FIG. 5 is a sectional view along the lines 5—5 of FIG. 3 and

FIG. 6 shows an alternate form of a portion of the invention.

Figure 1:
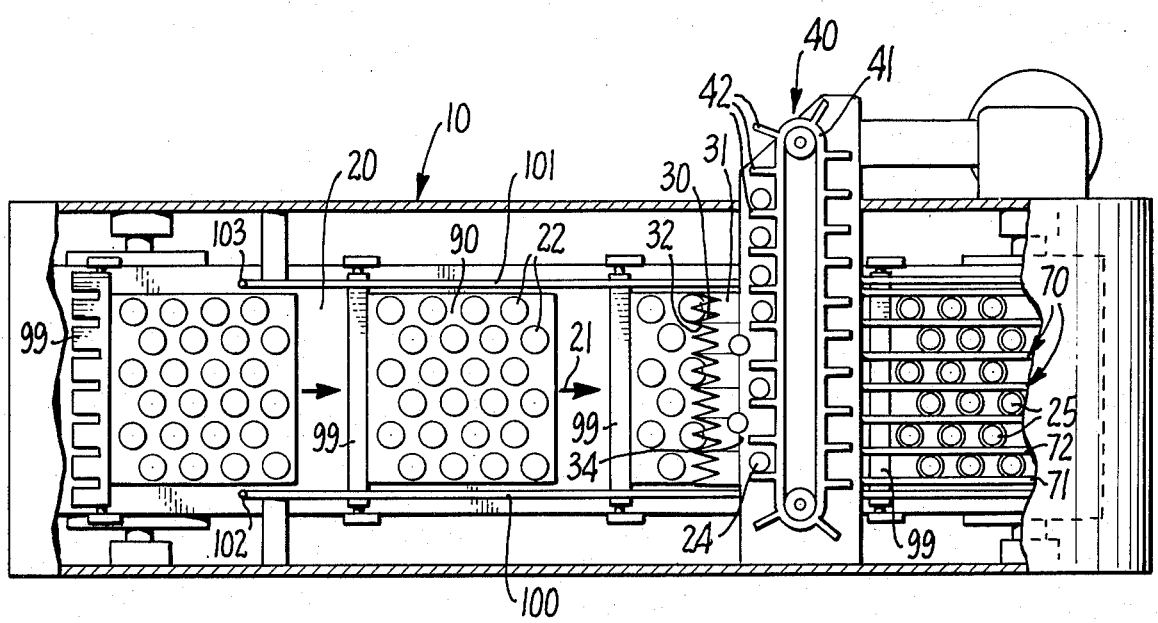
FIG. 1 is a top elevational view of the machine, partially in section.

Referring to FIG. 1, an egg cracking machine 10 is shown. A first conveyor 20 moves in the direction of arrow 21, carrying a plurality of eggs 22 along a predetermined path formed by the surface of the conveyor 20.

Slicing means 30, which is a stationary blade 31 extending transversely to the direction of movement of conveyor 20 and having a sawtooth shaped leading edge 32, splits the eggs 22 near the top and the egg tops 24 are severed from egg bottoms 25.

The egg tops 24 are transported away from slicing means 30 for disposal by second conveyor means 40.

Second conveying means 40 comprises a continuous belt 41 running in a direction transverse to the direction of movement of first conveyor 20 and is located at the downstream end 34 of slicing means 30. Belt 41 has a plurality of fingers 42 extending upstream to receive the egg tops 24 therebetween.

Figure 2:
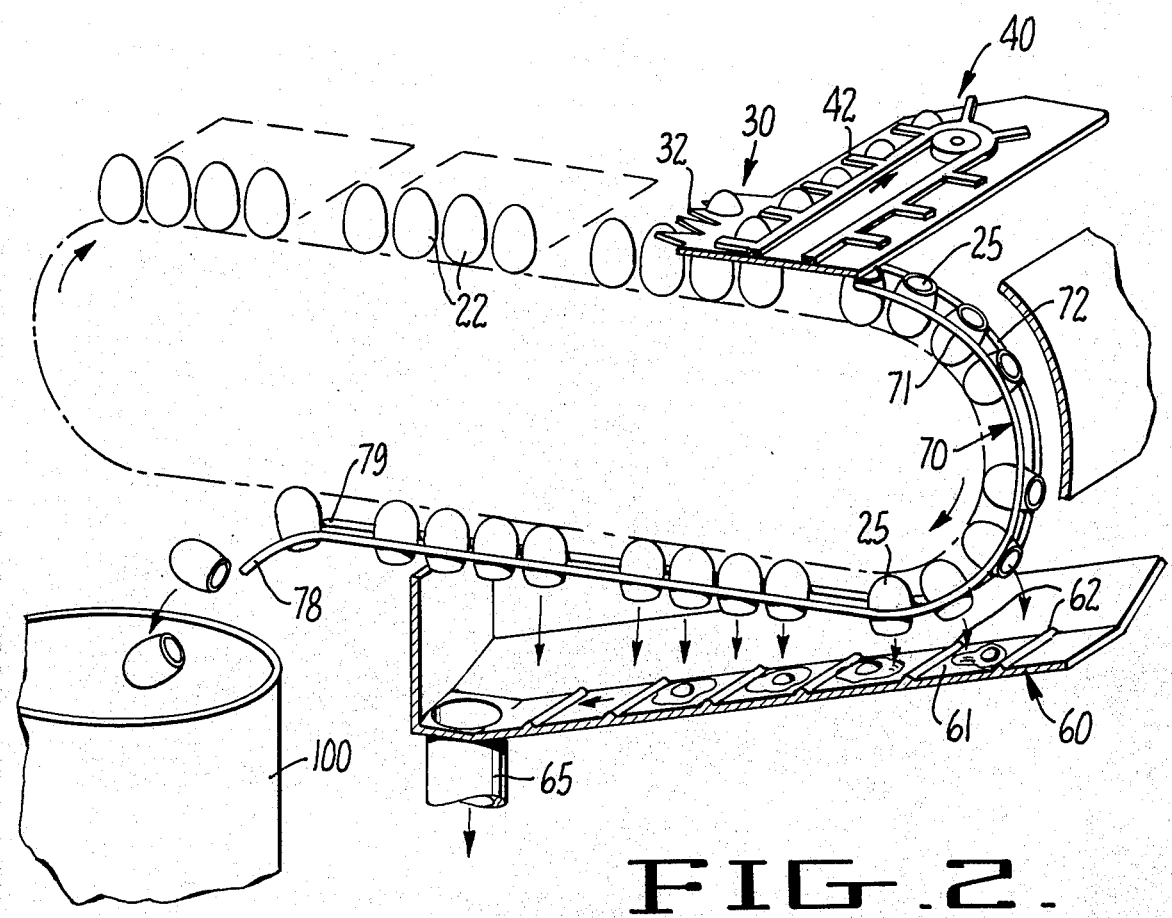
FIG. 2 is a schematic representation of the apparatus shown in FIG. 1.

Referring to FIG. 2, the egg bottoms 25 are inverted after the tops have been severed, and the contents of egg bottoms 25 are emptied into collector means 60. Egg bottoms 25 are inverted by inversion means 50 (shown best in FIG. 3) which comprises a roller 51 mounted on shaft 52. As the conveyor 20 passes over inversion means 50, the egg bottoms 25 are rotated 180° and are completely emptied.

The egg bottoms are prevented from falling into collector means 60 by guide means 70. Guide means 70 comprises a pair of stationary rails 71 and 72 mounted on the opposite side of the center of gravity 29 of the egg bottoms from the surface of said first conveyor 20, as shown best in FIG. 5. A pair of guide rails is provided for each row of eggs as shown in FIG. 1. Egg bottoms 25 slide against guide rails 71 and 72 as they are inverted.

Guide means 70 may comprise alternatively a single stationary rail 171 as shown in FIG. 6. The stationary rail 171 is mounted slightly away from the upper surface 26 of egg bottoms 25. By stating that guide rail 171 is mounted "slightly away from" the upper surface 26 of egg bottom 25, it is meant that guide means 171 is sufficiently close to the surface of conveyor 20 that the egg bottom 25 is still supported by and transported by egg flat 90 as the egg bottoms 25 are inverted. The upper surface 26 slides against rail 171 as the egg bottoms 25 are inverted.

Collector means 60 comprises an inclined trough 61 extending beneath guide means 70 and having ribs 62 extending across the surface thereof in a direction perpendicular to the direction of inclination, so that portions of egg shells which might be present along with the contents of the eggs in trough 61 are retained on the upper portions of ribs 62. As shown best in FIG. 3, the egg contents 28 pass down the inclined trough 61 over ribs 62 as shown by arrows 64 and into container 65 for eventual use.

In the embodiment shown, eggs 22 are carried in egg flats 90 which comprise sheets of corrugated paper for receiving and containing a plurality of eggs. As shown in FIGS. 3 and 4, clip means 95 resiliently urges egg flat 90 against the surface of conveyor 20. A plurality of clip means 95 is carried by conveyor 20. Each clip means has an arm 96 connected to a spring 97 which urges arm 96 into the open position shown as 98 in FIG. 3. Shaft 99 carries the spring 97 and is connected to conveyor 20. Clip control rails 100 and 101 rotate the arms 96 of clip means 95 into resilient contact with egg flat 90. The upstream ends 102 and 103 of clip control rails 100 and 101, respectively, are flared upwards as shown in FIG. 3 and forces arm 96 of clip means 95 into contact with egg flat 90. Clip means 95 serves to hold egg flat 90 in contact with conveyor 20 as egg bottoms 25 are inverted. Clip means 95 may be applied to the forward edge 91 of egg flat 90 as well as that the trailing edge 92 of egg flat 90.

Guide rails 71 and 72 terminate at ends 78 and 79 which are above refuse continer 100 into which the empty egg bottoms are dropped. The end 104 of clip control rail 100 is flared downwardly as shown in FIG. 3 to release clip means 95, permitting egg flat 90 to drop into refuse container 100.

In operation, as eggs 22 move along the surface of conveyor 20, they impinge against stationary slicing means 30, whereby each egg is split near its top and the egg top is severed from the bottom and carried away from slicing means 30 by second conveyor means 40 for disposal. The egg bottoms 25 are inverted by the rotation induced by inversion means 50 and their contents are allowed to spill into collector means 60. Any incidential shell fragments intermixed with the egg contents are retained on the upper edges of ribs 62, but the egg white and egg yolks flow over ribs 62 into container 65 for use in cooking. Guide means 71 and 72 prevent the egg shell from dropping into collector means 60.

Referring to FIG. 1, a plurality of guide means 70 is employed in such fashion that each row of eggs passing along the surface of conveyor 20 passes between a pair of guide rails such as 71 and 72. When the alternate form of guide means 171 (FIG. 6) is used, each row of eggs passing along the surface of conveyor 20 is aligned with a separate guide rail 171 which is mounted directly above the center of the egg bottom 25 as is shown in FIG. 6.

The upstream ends 102 and 103 of clip control rails 100 and 101 are located upstream of slicing means 30, whereby the egg flats 92 are held against the conveyor 20 as the eggs are being sliced. The upstream ends 102 and 103 of rails 100 and 101 may be located downstream of slicing means 30.

Optional stabilizing means 120 is shown in phantom in FIG. 3. Stabilizing means 102 is a resilient horizontal member extending upstream of slicing means 30. As the eggs impinge against blade 31, stabilizing means 120 prevents the eggs from being lifted out of egg flats 92. This is accomplished by positioning the lower surface 121 of stabilizing means 120 in slight frictional engagement with the upper surface 28 of eggs 22.

I claim:

1. An egg cracking machine comprising:
    a first conveyor for moving a plurality of eggs in egg flats along a predetermined path,
    slicing means mounted above the surface of said conveyor such that as the eggs are carried past said slicing means by said conveyor, the eggs are split near the top and the egg top is severed from the egg bottom,
    second conveyor means for transporting the severed egg tops away from said slicing means for disposal,
    inversion means for inverting said egg bottoms to empty the contents of the eggs,
    collector means for receiving the contents of the eggs, and
    guide means for preventing the egg shells from falling into said collector means as the eggs are inverted, said guide means comprising a stationary rail mounted slightly away from the upper surface of said severed egg bottoms and against which said severed egg bottoms slide as they are inverted.

2. The apparatus of claim 1 further comprising clip means acting between said egg flats and said guide means for urging said egg flats against the surface of said first conveyor while the egg bottoms are being inverted.

* * * * *